(12) United States Patent
Thorwarth

(10) Patent No.: US 11,110,557 B2
(45) Date of Patent: Sep. 7, 2021

(54) MANUFACTURING STATION AND MANUFACTURING PROCESS

(71) Applicant: KUKA Systems GmbH, Augsburg (DE)

(72) Inventor: Paul Thorwarth, Augsburg (DE)

(73) Assignee: KUKA Systems GmbH, Augsburg (DE)

( * ) Notice: Subject to any disclaimer, the term of this patent is extended or adjusted under 35 U.S.C. 154(b) by 309 days.

(21) Appl. No.: 16/304,232

(22) PCT Filed: May 24, 2017

(86) PCT No.: PCT/EP2017/062624
§ 371 (c)(1),
(2) Date: Nov. 23, 2018

(87) PCT Pub. No.: WO2017/202961
PCT Pub. Date: Nov. 30, 2017

(65) Prior Publication Data
US 2020/0324378 A1      Oct. 15, 2020

(30) Foreign Application Priority Data

May 24, 2016   (DE) ..................... 20 2016 102 752.7

(51) Int. Cl.
*B23P 21/00*      (2006.01)

(52) U.S. Cl.
CPC .................. *B23P 21/004* (2013.01)

(58) Field of Classification Search
CPC ..... B23P 21/004; B23P 2700/50; B23P 21/00; B23Q 7/04; B23Q 7/16; B23Q 41/02;
(Continued)

(56) References Cited

U.S. PATENT DOCUMENTS 5,091,855 A * 2/1992 Umehara ............. G05D 1/0265
701/23
2001/0003861 A1   6/2001 Mayr et al.
(Continued)

FOREIGN PATENT DOCUMENTS

CN        103192288 A    7/2013
DE        29813669 U1    1/2000
(Continued)

OTHER PUBLICATIONS

European Patent Office; Search Report in related International Patent Application No. PCT/EP2017/062624 dated Aug. 10, 2017; 6 pages.
(Continued)

*Primary Examiner* — Jun S Yoo
(74) *Attorney, Agent, or Firm* — Dorton & Willis, LLP

(57) ABSTRACT

A manufacturing station and a manufacturing process for workpieces, in particular car body parts. The manufacturing station includes a processing area having a working point and a processing apparatus. A security partition surrounds the processing area and has a secure access point for workpiece transport. The manufacturing station further includes an automatic loading apparatus with loading robots. The loading apparatus loads and unloads workpieces onto and off a conveyor and transports the workpieces into and out of the processing area. The automatic and multifunctional loading apparatus is arranged, together with a workpiece support, inside the security partition, wherein the workpiece support is arranged within the working area of the loading robots. A loading robot provides workpieces and carries out a setting-up procedure.

19 Claims, 2 Drawing Sheets

(58) Field of Classification Search
CPC ........ B23Q 41/04; B23Q 41/06; B25J 9/0093; B25J 21/00; B25J 9/0084; B25J 9/0096; B62D 65/022
See application file for complete search history.

(56) References Cited

U.S. PATENT DOCUMENTS

| | | | |
|---|---|---|---|
| 2002/0002418 A1* | 1/2002 | Pratt | B23K 26/0861 |
| | | | 700/166 |
| 2015/0240744 A1* | 8/2015 | Marrocco | F01L 3/10 |
| | | | 29/888.06 |
| 2015/0306715 A1* | 10/2015 | Arriola Badiola | B23P 19/02 |
| | | | 29/213.1 |
| 2017/0015373 A1 | 1/2017 | Thorwarth | |

FOREIGN PATENT DOCUMENTS

| | | |
|---|---|---|
| DE | 202008003142 U1 | 7/2009 |
| DE | 202015100782 U1 | 5/2016 |
| WO | 0007870 A1 | 2/2000 |
| WO | 2015132378 A1 | 9/2015 |

OTHER PUBLICATIONS

European Patent Office; Written Opinion in related International Patent Application No. PCT/EP2017/062624 dated Aug. 10, 2017; 6 pages.
German Patent Office; Search Report in related German Patent Application No. 20 2016 102 752.7 dated Jul. 10, 2017; 5 pages.
Chinese Patent Office; Office Action in related Chinese Patent Application No. 201780032467 dated May 12, 2020; 12 pages.

* cited by examiner

MANUFACTURING STATION AND MANUFACTURING PROCESS

CROSS-REFERENCE TO RELATED APPLICATIONS

This application is a national phase application under 35 U.S.C. § 371 of International Patent Application No. PCT/EP2017/062624, filed May 24, 2017 (pending), which claims the benefit of priority to German Patent Application No. DE 20 2016 102 752.7, filed May 24, 2016, the disclosures of which are incorporated by reference herein in their entirety.

TECHNICAL FIELD

The invention concerns a manufacturing station and a manufacturing process with the characteristics of the generic concept of the principal process and the device claim.

BACKGROUND

Such a manufacturing station is known from the WO 2015/132378 A1. It has two cell-like processing areas, each of which has a working point and a processing apparatus, as well as a security partition, in particular a fence, surrounding the respective processing area with a secure access point for workpiece transport. The manufacturing station furthermore comprises an automatic loading apparatus with loading robots, which are designed to load and unload workpieces onto and off a means of conveyance outside of the security partition as well as to transport the workpieces into and out of the processing area through the secure access point.

SUMMARY

It is the object of this invention to disclose an improved manufacturing technology.

The invention achieves this object by means of the characteristics in the principal process and apparatus claim. The claimed manufacturing technology, i.e. the manufacturing station and the manufacturing process, have different advantages. The automatic and multi-functional loading apparatus and/or its loading robot are disposed within the aforesaid security partition along with a workpiece support. The workpiece support is located in the work area of the loading robots, which can access it as needed. A loading robot unloads the conveyor means and prepares the unloaded workpieces onto the workpiece support and performs a setup process on the unloaded workpieces.

The claimed manufacturing technology offers particular advantages regarding optimal utilization of the available times, in particular cycle times, and the extent of utilization of the utilized robots as well as the compact and space-saving design and layout of the manufacturing station. The loading, preparation and processing times can overlap. In a particularly advantageous embodiment, the manufacturing station has a single processing area with two preferably stationary loading robots and a workpiece support disposed between the loading robots. The manufacturing station can alternatively have several processing areas. These can be technically and logistically linked to each other. A multiple arrangement of loading robots and workpiece supports is furthermore possible.

A loading robot is configured as a mounting robot and performs the unloading of the conveyor means and the provision of one or more workpieces to the workpiece support. The loading robot additionally performs a set-up process, e.g. selecting of the unloaded workpieces on the workpiece support and/or the preparation of the unloaded workpieces for a subsequent process performed in the processing area, in particular an assembly process. Such a preparation process can consist of several individual processes or work contents. The preparation and commissioning of the workpieces can possibly also include an assembly and a pre-joining of individual workpieces.

Another loading robot is configured and controlled as a presentation robot and serves the purpose of supplying workpieces provided from the workpiece support to the processing area and possibly also removing the workpieces from the processing area and for loading them onto a conveyor means after the process.

The security partition has an access point configured for the secured inlet and/or outlet of the conveyor means and a pass-through area within the security partition with several stops for the conveyor means. The stops can respectively be assigned to the loading robot. They can be located in the area of the workpiece support. The unloading of the one or more workpieces from the conveyor means and their provision at the workpiece support as well as the preparation process take place at one of these stops. At the other stop, the, e.g., connected workpieces are reloaded onto the same or another conveyor means after the process has been completed.

There can be one or more additional stops between the stops for unloading and loading. These can, e.g., serve as waiting positions and/or for buffering purposes and/or as temporary deposits. This is of particular advantage in the case of an alternative manufacturing station with several processing areas and/or several workstations.

The manufacturing station can be configured to be type-flexible and is suitable for the implementation of processes of different kinds on different and type-specific workpieces, in particular car body parts. This allows for highly flexible manufacturing. The loading robots can have changeable tools, in particular gripping tools, and can access tool magazines in the work area. The processing apparatus can have a fixed or a changeable workpiece holder at the working point and one or more process robots, in particular assembly robots. A changeable workpiece mounting that is adaptable to the respective type of workpiece is of advantage for the aforesaid type-flexible manufacturing. It can, e.g., be supplied and exchanged by means of further access into the security partition by conveyor means.

Floor-level conveyors are particularly suitable as conveyor means. These can, e.g., be automated, driverless vehicles, e.g. AGV or FTS, which can be programmed to run in arbitrary directions on conveying routes and are then steerable and can take curves. A configuration in the form of multidirectionally movable or surface-mobile conveyor means is of particular advantage. These conveyors can be moved in arbitrary directions from a stationary or a moving condition, in particular also transverse to their longitudinal axis. Other kinds of conveyor means, e.g. with pendent position and guidance, are alternatively conceivable. A conveyor means can be also designed as a base-mounted or elevated friction roller system.

A manufacturing system can have one or more of the aforesaid manufacturing stations in which different process steps of a manufacturing process common to the station can be performed on the workpieces. Aside from the one or more manufacturing stations, the manufacturing system can have a conveying system with several conveyor means as well as additional components, e.g. a logistics center for supplying workpieces, additional manufacturing stations or manufacturing stations of a different design, etc. It is additionally advantageous for purposes of highly flexible production if the conveyor means have a type-specific, coded and preferably also changeable load handling device, which serves the purpose of controlled lifting of one or more type-specific workpieces. The conveyor means can have a type-neutral design and are respectively equipped in the aforesaid logistics area with the needed load handling devices and then loaded with the type-specific workpieces.

It is additionally advantageous for the manufacturing system and/or the conveyor system to have a conveying path, which extends along a set of manufacturing stations and which has several parallel conveyor tracks, in particular lanes, for the conveyor means. The single conveyor track moving past the access points of the manufacturing stations can be used for entry into and exit out of in the respective manufacturing station. The additional conveyor track can be used for fast traffic and for traveling long distances. It can also be used for supplying and removing workpieces (4) to and from the manufacturing stations (2), e.g. in order to allow for type-flexible production. There is then an option for the conveyor means (22) to cross over the conveyor track (28) onto the conveyor track (29).

The number of conveyor tracks can be greater than two. One way traffic with preferably the same direction of travel on the parallel conveyor tracks is advantageous. It is alternatively also possible to set up two-way traffic via an appropriate design of the conveyor track.

The above and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

The invention is explained schematically and by means of examples in the drawings, which show the following in detail.

DETAILED DESCRIPTION

The invention concerns a manufacturing station (2) and a manufacturing process. The invention furthermore concerns a manufacturing system (1) with one or more of these manufacturing stations (2) along with associated processes.

Figure 1:
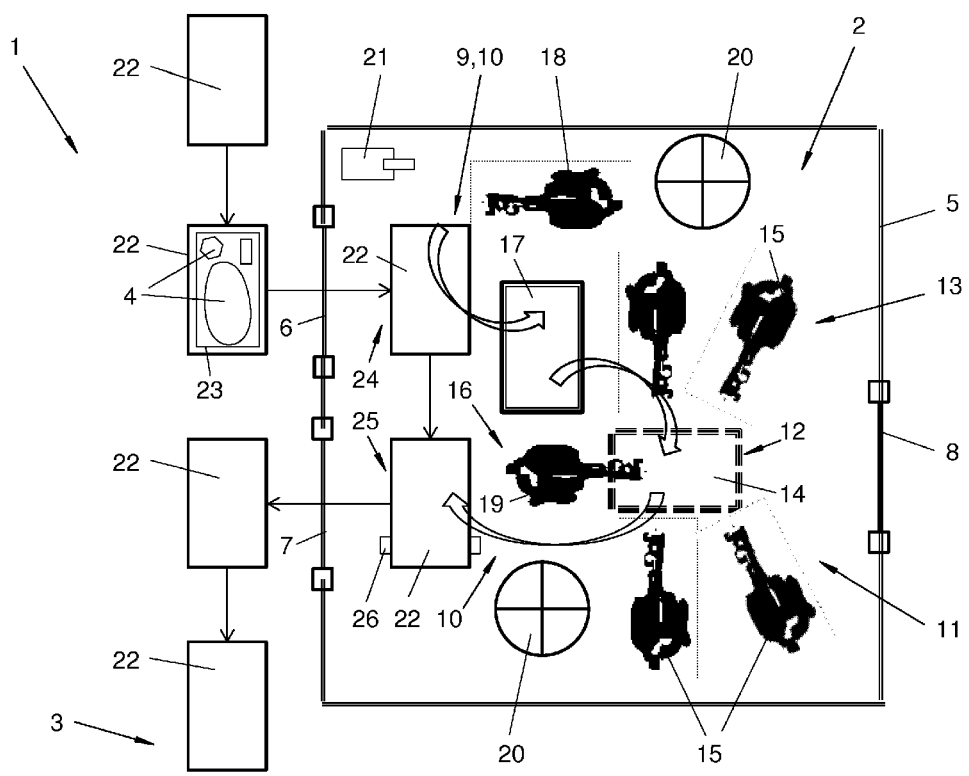
FIG. 1 is a schematic top view of a manufacturing station.
Figure 2:
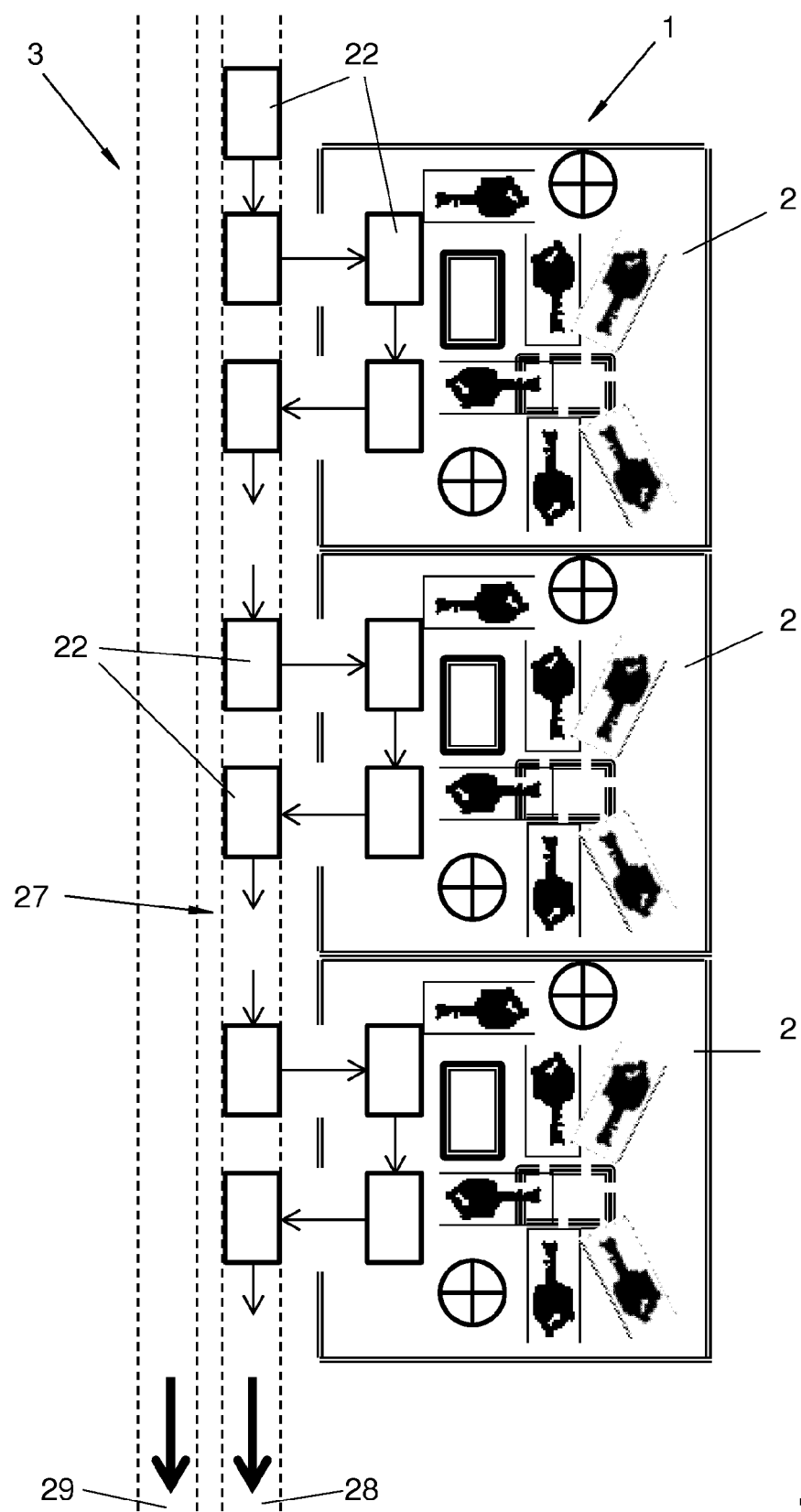
FIG. 2 is a schematic and partial top view of a manufacturing system with a set of manufacturing stations and a conveying system with a conveying path.

FIG. 1 shows a top view of a schematic representation of a manufacturing station (2). FIG. 2 shows a schematic and truncated view of manufacturing system (1) preferably having a straight line of manufacturing stations (2), which are, e.g., directly adjacent to one another. The manufacturing system (1) can furthermore comprise a conveyor system (3) with several conveyor means (22) and one or more conveying paths (27) for workpiece transportation as well as additional components. A component not represented can e.g. be a logistics area for supplying and allocating as well as loading the conveyor means (22) with workpieces (4). The logistics area can also be used to stock and maintain the conveyor means (22).

The workpieces (4) can be of any kind and size. This preferably concerns body parts of vehicle body shells. The workpieces (4) can, e.g., be sheet metal parts and/or plastic parts or parts made of other materials. The workpieces (4) can be designed to be type-specific and be intended for different body types. Body types can, e.g., differ in the number of doors and the body shape (sedan, convertible, delivery van, etc.). The same thing can apply to other kinds of workpieces for final structures other than vehicle bodies. It is possible to produce the workpieces (1) in the manufacturing system (1) in one or more manufacturing steps, with one process step or possibly the entire process being carried out in one or several manufacturing stations (2).

Conveyor means (22) supply the workpieces (4) to the respective manufacturing station (2) and carry them away again after the process has been completed. In doing so, one or more workpieces (4) can be transported individually or in groups on a conveyor means (22). The entire process and/or the process steps can be of different kinds. This can, e.g., concern assembly processes. After such an assembly process, a finished assembly of several workpieces (4) is carried away, e.g. from the manufacturing station (2). The term workpiece (4) is also understood include such an assembly.

The conveyor means (22) can hold and secure the workpiece(s) (4) in a defined position. A load suspension device (23) (for short LSD) can be disposed on the conveyor means (22) in a fixed or exchangeable manner for this purpose. The LSD (23) can, e.g., have a frame or skeleton-like design. It can hold one or more workpieces (4) in a prescribed exact position next to each other and/or on top of each other. It can e.g. have positioning components and controllable clamping devices. In doing so, the LSD (23) can be adapted to type-specific workpieces (4) and can have a suitable type-specific shape. The LSD can furthermore carry coding and can therewith transmit information concerning the type and the nature, the number and arrangement of the workpieces (4), as well as, if necessary, the manufacturing conditions. The coding can be conveniently read out outside of or in a manufacturing station (2). It can also, if necessary, be inscribed with process-specific information after the completion of the process.

The LSD (23) can be provided and controlled within said logistics area. They can possibly be mounted and changed as needed on neutral conveyor means (22) in said area.

The manufacturing station (2) shown in FIG. 1 has a processing area (11) with a working point (12) and a processing apparatus (13). The manufacturing station (2) preferably has an individual processing area (11). This constitutes a manufacturing cell. In another embodiment not shown, the manufacturing station (2) can have several processing areas (11) and has a multi-cellular design. The manufacturing station (2) can also have a processing area (11) with several working points (12).

A workpiece mounting (14) can be present at the working point (12). The latter can be configured as a stationary or non-stationary mounting with suitable positioning and clamping elements for the defined mounting of one or more workpieces (4). The workpiece mounting (14) can be fixed or changeable. It can have a type-specific design. The tool mounting (14) can, e.g., be configured as a type-specific clamping and positioning device, which can be exchanged as a whole or which is located on a stationary base in a defined and changeable manner. The workpiece mounting (14) can possibly also be omitted.

The processing apparatus (13) can have several processing devices (15), which perform said process on the workpiece(s) (4). The processing devices (15) can, e.g., be processing robots, in particular assembly robots. They can be located on one or more sides of the working point (12) and the workpiece mounting (14). In an alternative configuration with several working points (12), the layout of the processing devices (15) is adjusted accordingly.

The processing area (11) is enclosed by a security partition (5). The security partition (5) is, e.g., configured as a fence or in some other suitable way and secures the inner station area, in particular the processing area (11), against uncontrolled access by people or devices. The security partition (5) has several secure access points (6, 7, 8), which allow for controlled and secured access into the protected interior of the station. The access points (6, 7, 8) can be in the form of monitored and controlled locks, e.g. roller doors or the like.

One side of the security partition (5) there are one or more secure access points (6,7) for workpiece transport and for the inlet and/or outlet of a conveyor means (22). In the embodiment shown, there are two separate access points (6, 7) pointing toward the conveying path (27), with the access point (6) being configured as the entry gate and the access point (7) as the exit gate of a conveyor means (22). A single access point can alternatively be provided for entry and exit.

Another secure access point (8) can be disposed at another location, e.g. at the back side of the security partition (5), near the processing area (11). It is by way of the access point (8) that the workpiece mounting (14) can be changed if needed. The access point (8) can also be designed for the passage of a conveyor means (22).

There is a pass-through area (9) for a conveyor means (22) with several, in particular two, defined stops (24, 25) within the manufacturing station (2) and the security partition (5). The pass-through area (9) is connected to the access points (6, 7) and connects the possibly separated access points (6, 7). The unloading or offloading of the workpiece(s) (4) from a conveyor means (22) and/or LSD (23) takes place at the stop (24). The loading or lading of the workpieces (4) after the execution of said process onto the same or another conveyor means (22) and/or LSD (23) takes place at the stop (25). One or more additional stops can be disposed between said stops (24, 25) for unloading and loading.

A positioning device (26), which provides for the exact and specified positioning of the respective conveyor means (22), can be disposed at the stops (24, 25). The positioning device (26) can alternatively or additionally position an LSD (23) on a conveyor means (22) and/or it can position one or more workpieces (4) on a conveyor means (22). It can, if need be, lift off and position an LSD (23) from the conveyor means (22). The positioning device (26) can also perform the monitoring and control of the correct workpiece position, as well as of the provided number, nature and size of the workpieces (4). Process control and station monitoring concerning this can be implemented.

The manufacturing station (2) has an automatic loading apparatus (16), which is designed to unload one or more workpieces (4) from a conveyor means (22) and to load them onto a conveyor means (22). The loading apparatus (16) furthermore serves the purpose of transporting the workpieces (4) into the processing area (11) and out of the processing area (11). The loading apparatus (16) can additionally be used to transport one or more workpieces (4) within the processing area (11), e.g. for additional processing.

In the embodiment shown, the loading apparatus (16) has two loading robots (18, 19). These are preferably disposed in a stationary manner. A workpiece support (17) is located between the loading robots (18,19) disposed at a distance from each other and preferably along the pass-through area (9). It is located in the work area of both loading robots (18,19). The workpiece support (17) can be disposed in a stationary manner. The workpiece support (17) can be configured in a table-like manner.

The pass-through area (9) for a conveyor means (22) in the manufacturing station (2) is a component of a loading area (10), in which the unloading and loading processes are performed by the loading apparatus (16) and/or the loading robots (18, 19).

One of the loading robots (18) serves the purpose of unloading and providing the workpieces (4). It can also carry out a setup process. The loading robot (18) is configured as an assembly robot and has a suitable fixed or changeable tool, e.g. a gripping tool. It is located at a stop (24).

The conveyor means (22) located at the stop (24) and its workpieces (4), the workpiece support (17) and a tool magazine (20) as well as a preparation device (21) are located in the work area of the preferably rotatable loading robot (18). The loading robot (18) is configured and controlled to perform the following operations: On the one hand it unloads the workpiece(s) (4) from the conveyor means (22) and makes them available on the workpiece support (17). It additionally performs a setup process, which can consist of one or more steps or tasks. In one setup process, the loading robot (18) can place the unloaded workpieces (4) in a given position and, if necessary, relative orientation on the workpiece support (17). The placement can also include an assembly of workpieces (4). The placement can also, e.g., include the provision of a batch of workpieces for the process that is to be performed. The workpiece support (17) can have suitable handling devices for a defined and positionally accurate accommodation of one or more workpieces (4).

A setup process can consist of a process preparation of one or more unloaded workpieces (4) for the subsequent process in the processing area (11). Such a process preparation can e.g. comprise the application of media, in particular the application of adhesive, to one or more workpieces (4). The preparation device (21) can, e.g., be configured as an application device for this purpose. Another preparation process can comprise a mechanical reshaping or other processing of a workpiece (4), with the loading robot (18) having a suitable tool for this purpose and/or one or more adapted preparation devices (21) being disposed in the robot working area.

The tool magazine (20) can hold different robot tools, which e.g. differ with respect to a type-specific design and/or different handling and processing functions.

The second loading robot (19) is designed as a presentation robot. It is disposed at the second stop (25). Its work area contains the working point (12), the workpiece support (17), the second stop (25) and, if necessary, another tool magazine (20). The preferably rotatable presentation robot (19) is designed and controlled for the following tasks: It serves the purpose of receiving supplied workpieces (4) from the workpiece support (17) and of supplying them to the processing area (11) and, if necessary, the accurately positioned delivery to the local workpiece mounting (14). Another task is the removal of workpieces (4) from the processing area (11) after the process has been performed, and loading these workpieces (4) onto a conveyor means (22) located at the second stop (25). The presentation robot

(19) can in addition play a supporting role in the process and can perform handling tasks there on the workpiece(s) (4). It can, e.g., take previously supplied workpieces (4) off the workpiece mounting (14) and present them to the processing robots (15) for the further processing of the bottom surface.

The loading and/or the presentation robot (19) can also present the workpieces (4) to the processing robots (15) for exclusive processing. A mounting device (14) can thus become unnecessary.

The loading robot and/or presentation robot (19) also has a preferably changeable robot tool, in particular a gripping tool. The loading robot (19) can also accommodate a machining tool or a processing tool and can participate in the process at the working point (12).

The unloading and preparation processes at one stop (24), the process in the processing area (11) and the loading of the conveyor means (22) at the second stop (25) can take place independently and can overlap temporally. New workpieces (4) can be unloaded, set up and made available in a setup procedure during this process. The removal of the workpieces (4) from the processing area (11) and the loading of a conveyor means (22) via the loading robot (19) can take place along a direct path. The loading robot (19) can then pick up the prepared next workpieces (4) from the workpiece support (17) on the way back and carry them to the processing area (11).

The stops (24,25) are spatially separated and disposed at a distance from each other. The unloaded conveyor means (22) can move from the stop (24) to the stop (25) for reloading. The unloaded conveyor means (22) can alternatively leave the manufacturing station (2) while another conveyor means (22) and if necessary another LSD (23) then drives directly to the stop (25) in order to receive the workpieces (4) coming from the process. This can be expedient in an assembly process so as to be able to accurately and if necessary type-specifically pick up an assembled group of workpieces having its own geometry. The workpieces (4) needed for the process can be supplied at the stop (24) by one or more conveyor means (22).

The loading and processing robots (14, 18, 19) are preferably designed to be programmable and multi-axis industrial robots. They have, e.g., four, five, six or more robotic axes. They can thus have any combination of rotational and/or translational robotic axes. Articulated arm robots or jointed arm robots with rotational axes are preferably used. The industrial robots can be equipped at the drive component with an exchange coupling and a media coupling for automatic tool exchange and the respective required media connection. The loading and processing robots (14, 18, 19) can be designed to be floor-bound or standing or hanging, e.g. in a portal.

The conveyor means (22) are preferably individually and independently movable. They can be configured in any suitable way. They are preferably floor conveyor means, which operate on the conveying path (27) on the plant floor. The conveyor means (22) can e.g. be designed as automated driverless vehicles, so-called AGV or FTS. They can move along the conveying path (7) and into the manufacturing stations (2), through the passage area (9) and out again under program control. The conveyor means (22) can be steerable and can take curves. They are preferably multi-directionally displaceable and/or movable over surfaces. They can, e.g., be equipped with mecanum wheels, which allow then to move in arbitrary directions.

In accordance with FIG. 2 a conveying path (27) extends along the row of manufacturing stations (2) and their access points (6, 7). Such a conveying path (27), can have several, e.g. two, parallel conveyor tracks (28, 29). The latter can form traffic lanes, on which the conveyor means (22) can operate independently. One way traffic with travel in the same direction can be provided for the conveyor tracks (28, 29).

It is of advantage to line up several conveying paths in order to optionally reach the manufacturing stations (2) in a row. It is possible to simultaneously carry out several independent production processes calling for more than just one manufacturing station (2) in the manufacturing system (1) and/or in several manufacturing stations (2).

The manufacturing facility (1) and the manufacturing stations (2) as well as the conveyer system (3) have suitable means of control. A plant control system can in particular be present, which controls the manufacturing process with possibly several production steps and the movements of the conveyor means (22) required for this. The control system can have a warehouse manager for controlling the workpiece and the production flow, as well as a fleet manager for controlling the movement of the conveyor means. The plant control system can in addition act on the logistics section tasked with the provision and administration of the conveyor means (22) and the LSD (23).

Modifications of the shown and described embodiments are possible in different ways. The characteristics of the shown embodiment and the aforementioned modifications can in particular be combined arbitrarily and if necessary also interchanged.

The number and the set-up of the loading robots (18, 19) can vary and can amount to three or more. A loading robot or a mounting robot (18) can act on several, e.g. two, workpiece supports (17) in several processing areas (11). A manufacturing station (2) can have several working points (12), which are disposed in one or more processing areas (11) and in which a multi-step process or several independent processes are performed. The number and the design of the workpiece supports (17), the loading and processing robots (15, 18, 19) is adjusted accordingly. The several working points (12) can be procedurally and logistically linked, with, e.g., the loading robots (18, 19) taking over the workpiece transport. One or more working points (12) can in addition connect to the pass-through area (9) and possibly to the additional stops present therein. The conveyor means (22) and/or LSD (23) present therein can be used as temporary storage or for parts storage and can be resupplied as the process progresses. A multi-part workpiece can be partly unloaded at the first stop (24) and subsequent unloading operations can take place at additional stops.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

REFERENCE SYMBOL LIST

1 Manufacturing system
2 Manufacturing station, manufacturing cell
3 Conveyor system 4 Workpiece, body part
5 Security partition, fence
6 Access point, lock, entry
7 Access point, lock, exit
8 Access point, lock, set-up access
9 Pass-through area
10 Loading area
11 Processing area
12 Processing point, working point
13 Processing apparatus
14 Workpiece mounting, mounting fixture
15 Processing robot, assembly robot
16 Loading apparatus
17 Workpiece support, provision, selection table
18 Loading robot, mounting robot
19 Loading robot, presentation robot
20 Magazine, tool magazine
21 Preparation device, application device
22 Conveyor means, vehicle, AGV, FTS
23 Load suspension device, LSD
24 Stop, loading position
25 Stop, loading position
26 Positioning device
27 Conveying path
28 Conveyor track, lane
29 Conveyor track, lane

What is claimed is:

1. A manufacturing station for workpieces, comprising:
a processing area with a processing site and a processing apparatus;
a security partition enclosing the processing area and including a plurality of secure access points for workpiece transport into and out of the security partition;
a multifunctional automatic loading apparatus including a plurality of loading robots and located within the security partition, the automatic loading apparatus configured to load and unload workpieces onto and off of a conveyor operating in cooperation with the manufacturing station, and to transport the workpieces into and out of the processing area; and
a workpiece support positioned in respective working areas of the plurality of loading robots;
wherein at least one of the loading robots is configured to make workpieces available to the workpiece support and to perform a setup process on the workpieces; and
wherein one of the plurality of loading robots is configured and controlled as a presentation robot for supplying workpieces from the workpiece support to the processing area.

2. The manufacturing station of claim 1, further comprising:
a pass-through area within the security partition, the pass-through area including a plurality of stops for the conveyor;
wherein at least one of the secure access points of the security partition is configured for at least one of a secure inlet of the conveyor into the processing area, or a secure outlet of the conveyor from the processing area.

3. The manufacturing station of claim 2, further comprising a positioning device for the conveyor, the positioning device disposed at the stops.

4. The manufacturing station of claim 2, comprising a single processing apparatus and two loading robots, each loading robot located at a respective stop.

5. The manufacturing station of claim 1, wherein separate access points for a secure inlet or outlet of the conveyor are located at one side of the security partition.

6. The manufacturing station of claim 5, wherein the security partition includes an additional secure access point for the conveyor in the vicinity of the processing site of the processing area.

7. The manufacturing station of claim 1, wherein one of the plurality of loading robots is configured and controlled to select and unload workpieces from the conveyor and to place the workpieces onto the workpiece support.

8. The manufacturing station of claim 7, wherein the loading robot is further configured and controlled to perform a setup process on the workpieces that have been unloaded from the conveyor.

9. The manufacturing station of claim 8, further comprising a preparation device disposed in the work area of the loading robot.

10. The manufacturing station of claim 1, wherein the loading robot that is configured as a presentation robot is further configured and controlled to remove workpieces from the processing area and to load the conveyor with the removed workpieces at a stop of a pass-through area for the conveyor within the security partition.

11. The manufacturing station of claim 1, wherein the processing apparatus comprises:
a workpiece mounting disposed proximate the processing site; and
at least one processing robot disposed proximate the processing site.

12. A manufacturing system for workpieces, the manufacturing system comprising:
at least one manufacturing station according to claim 1; and
a conveyor system with several conveyors for workpiece transport.

13. The manufacturing system of claim 12, wherein the conveyors are configured as floor conveyors, in particular as automated driverless vehicles.

14. The manufacturing system of claim 12, further comprising:
a conveying path extending along a plurality of serially arranged manufacturing stations, the conveying path including several parallel conveyor track lanes.

15. The manufacturing system of claim 12, wherein the conveyors have a type-specific, coded load suspension device for the defined mounting of one or more workpieces.

16. A method for manufacturing workpieces, the method comprising:
moving workpieces on a conveyor to at least one manufacturing station, the manufacturing station including:
a processing area with a processing site and a processing apparatus,
a security partition enclosing the processing area and including a plurality of secure access points for workpiece transport into and out of the security partition,
an automatic loading apparatus including a plurality of loading robots and located within the security partition, and
a workpiece support in the working areas of the loading robots,
wherein one of the plurality of loading robots is configured and controlled as a presentation robot for supplying workpieces from the workpiece support to the processing area;

loading and unloading workpieces onto and off of the conveyor with the loading apparatus;

placing workpieces unloaded from the conveyor on the workpiece support with one of the plurality of loading robots; and performing a setup process on the workpieces using one of the plurality of loading robots.

17. The method of claim 16, further comprising:

moving workpieces into and out of the manufacturing station on the conveyor through separate access points in the security partition;

moving workpieces along a pass-through area inside the manufacturing station; and stopping at a plurality of locations in the pass-through area, between the access points.

18. The method of claim 16, wherein performing the setup process comprises stacking unloaded workpieces on the workpiece support.

19. The method of claim 16, wherein performing the setup process on the workpieces comprises applying an adhesive to the unloaded workpieces.

\* \* \* \* \*